(12) United States Patent
Takeuchi et al.

(10) Patent No.: US 7,909,392 B2
(45) Date of Patent: Mar. 22, 2011

(54) FENDER PROTECTOR STRUCTURE

(75) Inventors: Makoto Takeuchi, Kanagawa (JP); Hitoshi Nito, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 12/329,805

(22) Filed: Dec. 8, 2008

(65) Prior Publication Data
US 2009/0152901 A1 Jun. 18, 2009

(30) Foreign Application Priority Data
Dec. 17, 2007 (JP) .................. 2007-324479

(51) Int. Cl.
*B62D 25/16* (2006.01)
(52) U.S. Cl. .................. 296/198; 296/39.1; 280/850
(58) Field of Classification Search ............ 296/193.09, 296/198, 39.1; 180/84; 280/304.1, 770, 280/848, 849, 850, 851, 854, 304.3
See application file for complete search history.

(56) References Cited

U.S. PATENT DOCUMENTS

| | | | | |
|---|---|---|---|---|
| 4,735,427 A | * | 4/1988 | Fuchs | 280/847 |
| 5,613,710 A | * | 3/1997 | Waner | 280/848 |
| 5,829,786 A | * | 11/1998 | Dahl | 280/848 |
| 6,821,605 B2 | * | 11/2004 | Fiorinelli et al. | 428/159 |
| 7,497,509 B2 | * | 3/2009 | Omiya et al. | 296/198 |
| 2008/0150273 A1 | * | 6/2008 | Sugiyama et al. | 280/851 |

FOREIGN PATENT DOCUMENTS

| | | | | |
|---|---|---|---|---|
| JP | 360056680 A | * | 4/1985 |
| JP | 360259574 A | * | 12/1985 |
| JP | 405238428 A | * | 9/1993 |
| JP | 11208514 | | 8/1999 |
| JP | 2001180530 A | * | 7/2001 |
| JP | 2001260944 A | * | 9/2001 |
| JP | 2007223397 | | 9/2007 |
| JP | 2008037335 A | * | 2/2008 |
| KR | 62-097888 | | 6/1987 |
| KR | 63-043985 | | 3/1988 |
| KR | 2007-223397 | | 9/2007 |

OTHER PUBLICATIONS

English Patent Abstract of JP2007223397 from esp@cenet, published Sep. 6, 2007 (1 page).
European Search Report for European Application No. 08171724.1-2425, dated Feb. 25, 2009 (6 pages).
English Patent Abstract of JP11208514 from esp@cenet, published Aug. 3, 1999, 1 page.
Office Action in Korean Patent Application No. 10-2008-0114931, dated May 27, 2010 (4 pages).
Office Action in European Patent Application No. 08171724.1-2425, dated Jun. 1, 2010 (3 pages).

* cited by examiner

*Primary Examiner* — Jason S Marrow
(74) *Attorney, Agent, or Firm* — Osha • Liang LLP (57) ABSTRACT

A fender protector structure of a vehicle which includes a body structure including a body panel and a fender panel. The body structure defines a wheel well. A fender protector is connected to the body structure for covering an outer periphery of the wheel well, and a reinforcing structure for the fender protector extends from the body panel to the fender panel, wherein the reinforcing structure includes fixing the fender protector to the body panel.

17 Claims, 7 Drawing Sheets

FENDER PROTECTOR STRUCTURE

CROSS-REFERENCE TO RELATED APPLICATIONS

The present application claims priority from Japanese Patent Application No. 2007-324479, filed Dec. 17, 2007. The contents of the priority application are hereby incorporated by reference in their entirety.

BACKGROUND OF THE DISCLOSURE

1. Field of the Disclosure

The present disclosure relates to a fender protector structure of a vehicle. More particularly, the present disclosure relates to a fender protector structure having a reinforcing beam portion extending between a body panel and a fender panel.

2. Description of the Related Art

Japanese Laid-Open Patent Publication No. (Hei) 11-208514 (hereinafter "Patent Document 1") discloses a vehicle wherein a wheel arch portion is formed at a portion of a fender panel corresponding to a wheel well of a body structure, and wherein a fender protector is disposed on the fender panel so as to cover an outer side of a vehicle wheel well between the wheel arch portion of the fender panel and a vehicle body inner plate.

In such a structure, although fixing points can be formed on the fender protector for attachment to the fender panel at a vehicle body side at each end of a periphery of the wheel arch portion, it is difficult to establish a fixing point at the vehicle side at a peripheral intermediate portion of the wheel arch portion. Accordingly, sufficient rigidity may be lacking at the peripheral intermediate portion of the wheel arch portion for accommodating a load applied from the lateral outer side.

Thus, according to Patent Document 1, a rib is disposed at an outer end of the fender protector with respect to a vehicular width direction of the fender protector. Further, the rib contacts an inner surface of the fender panel to thereby enhance and improve the rigidity at the peripheral intermediate portion of the wheel arch portion.

However, since the rib extends only a short distance from the outer end of the fender protector in the vehicular width direction in the structure disclosed in Patent Document 1, the structure still lacks sufficient rigidity (e.g., at the lateral inner portion in the vehicular width direction compared to the rib). As a result, the structure lacks sufficient rigidity to accommodate an outer force exerted from the lateral outer side to the peripheral intermediate portion of the wheel arch portion.

SUMMARY OF THE CLAIMED SUBJECT MATTER

In one aspect, the present disclosure relates to a fender protector structure of a vehicle including a body structure including a body panel and a fender panel, the body structure defining a wheel well, a fender protector connected to the body structure and covering an outer periphery of the wheel well, and a reinforcing beam portion of the fender protector extending from the body panel to the fender panel.

In another aspect, the present disclosure relates to a method to manufacture a body of a vehicle including defining a wheel well with a body panel and a fender panel of a body structure, covering an outer periphery of the wheel well with a fender protector, extending a reinforcing beam portion of the fender protector from the body panel to the fender panel, and fixing the reinforcing beam portion of the fender protector to the body panel with a fixing portion.

In another aspect, the present disclosure relates to a fender protector structure of a vehicle including a body structure including a body panel and a fender panel, the body structure defining a wheel well, a fender protector means connected to the body structure for covering an outer periphery of the wheel well, and a means for reinforcing the fender protector extending from the body panel to the fender panel, wherein the means for reinforcing includes a means for fixing the fender protector to the body panel.

BRIEF DESCRIPTION OF DRAWINGS

Features of the present disclosure will become more apparent from the following description in conjunction with the accompanying drawings.

DETAILED DESCRIPTION

Hereinafter, embodiments of the present disclosure will be explained in detail with reference to the drawings.

Figure 1:
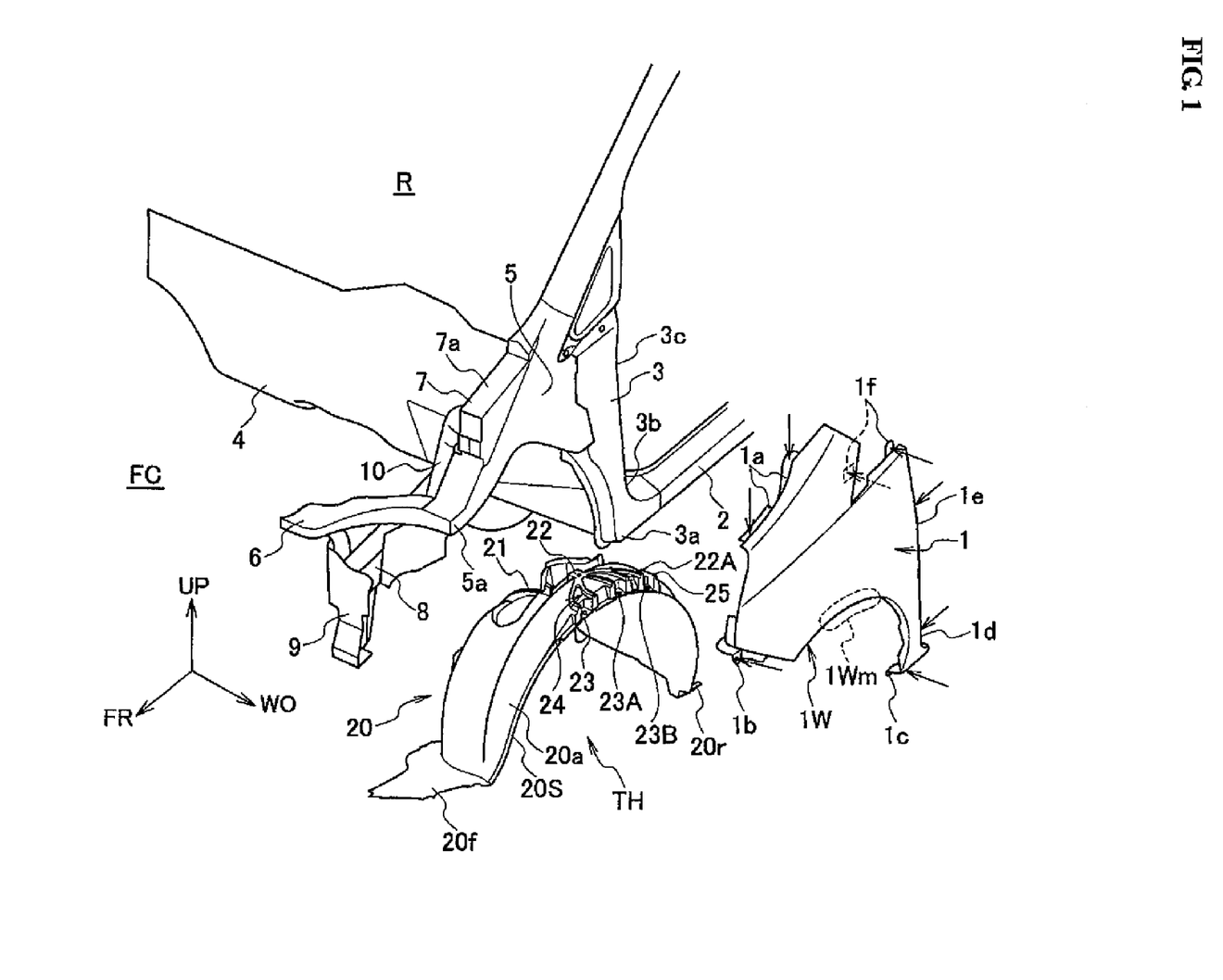
FIG. 1 is an exploded perspective view of a vehicle body structure including a fender protector in accordance with embodiments of the present disclosure.
Figure 2:
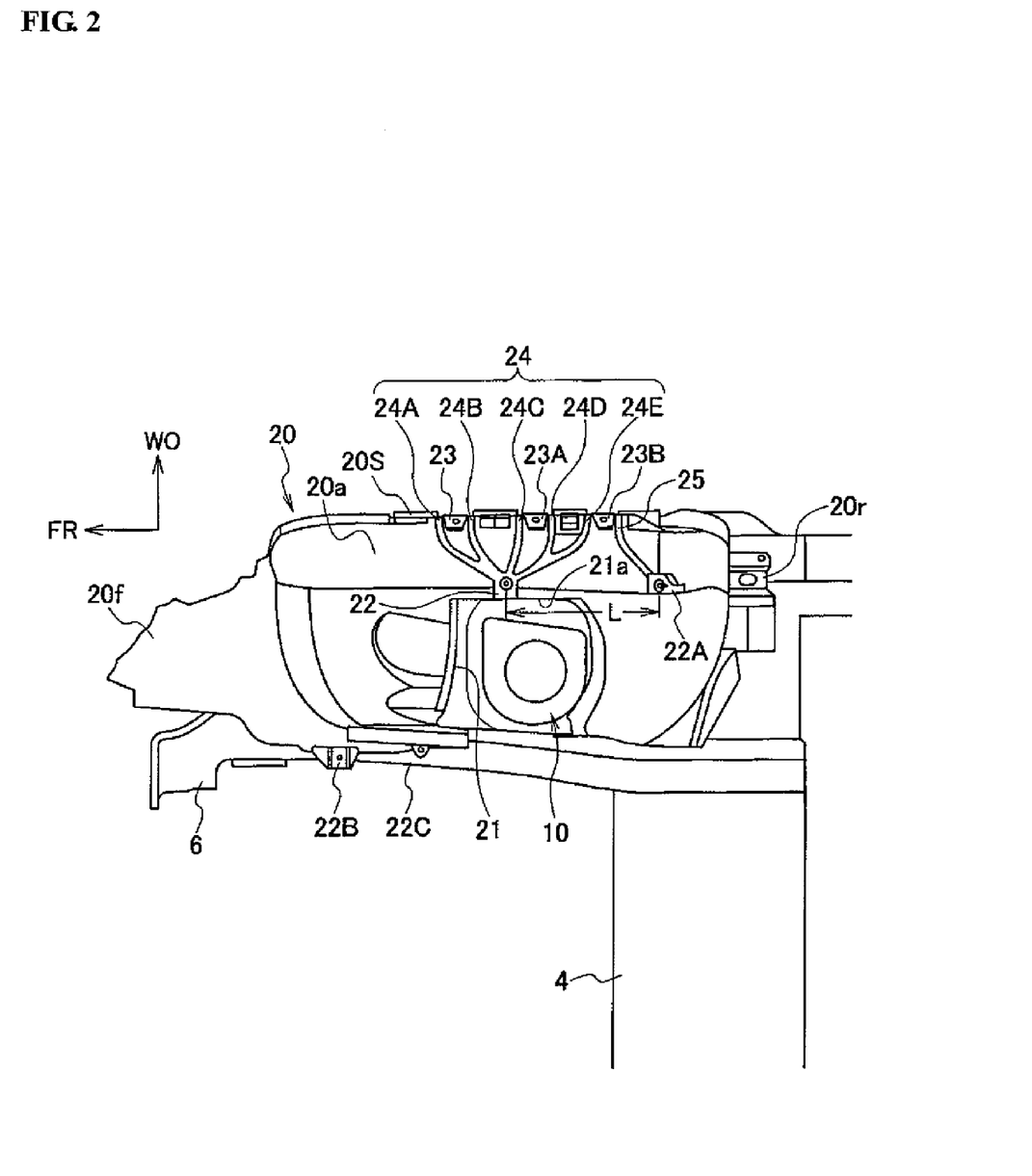
FIG. 2 is a bottom view of a fender protector in accordance with embodiments of the present disclosure.
Figure 3:
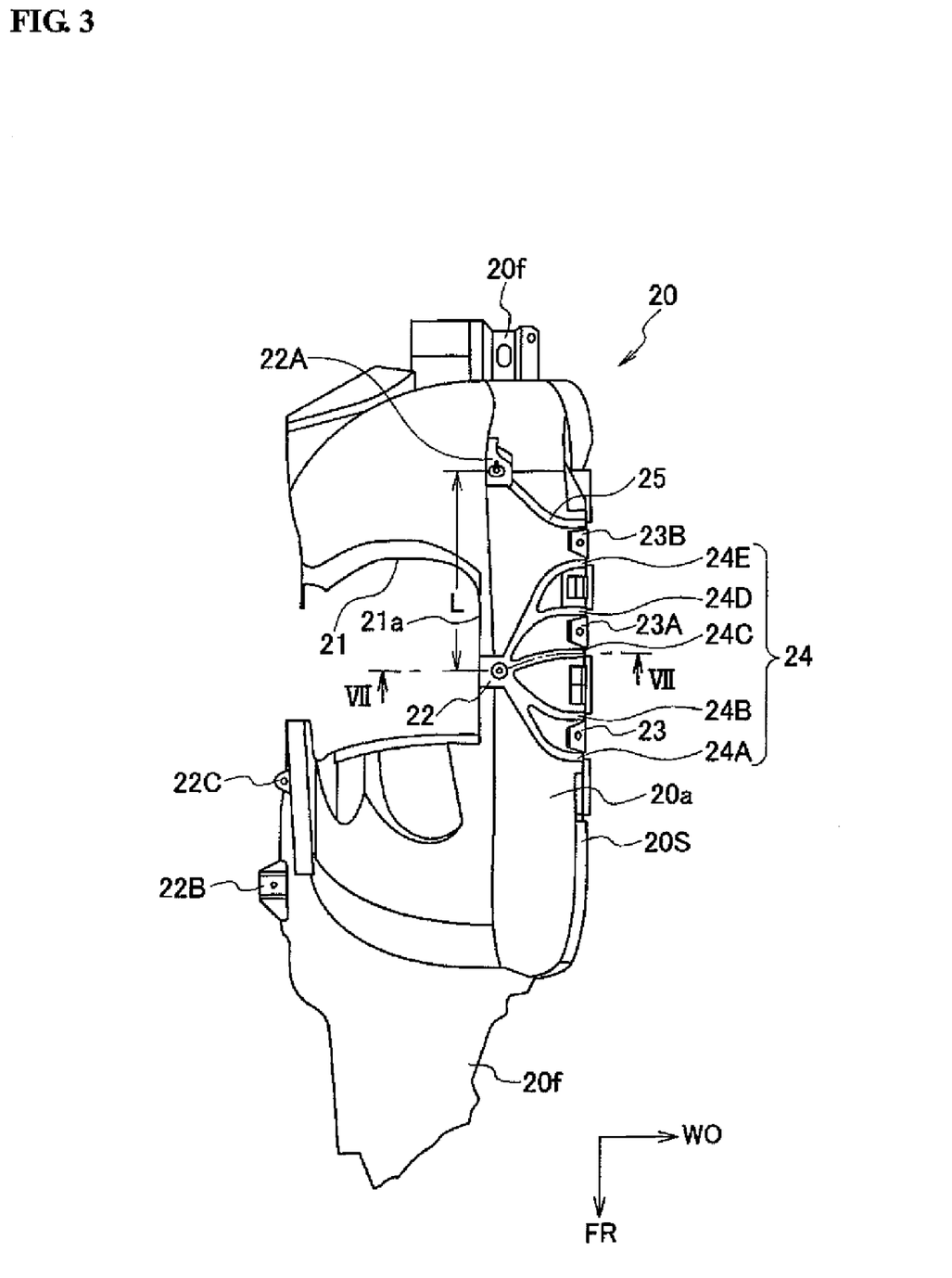
FIG. 3 is a top view of the fender protector in accordance with embodiments of the present disclosure.
Figure 4:
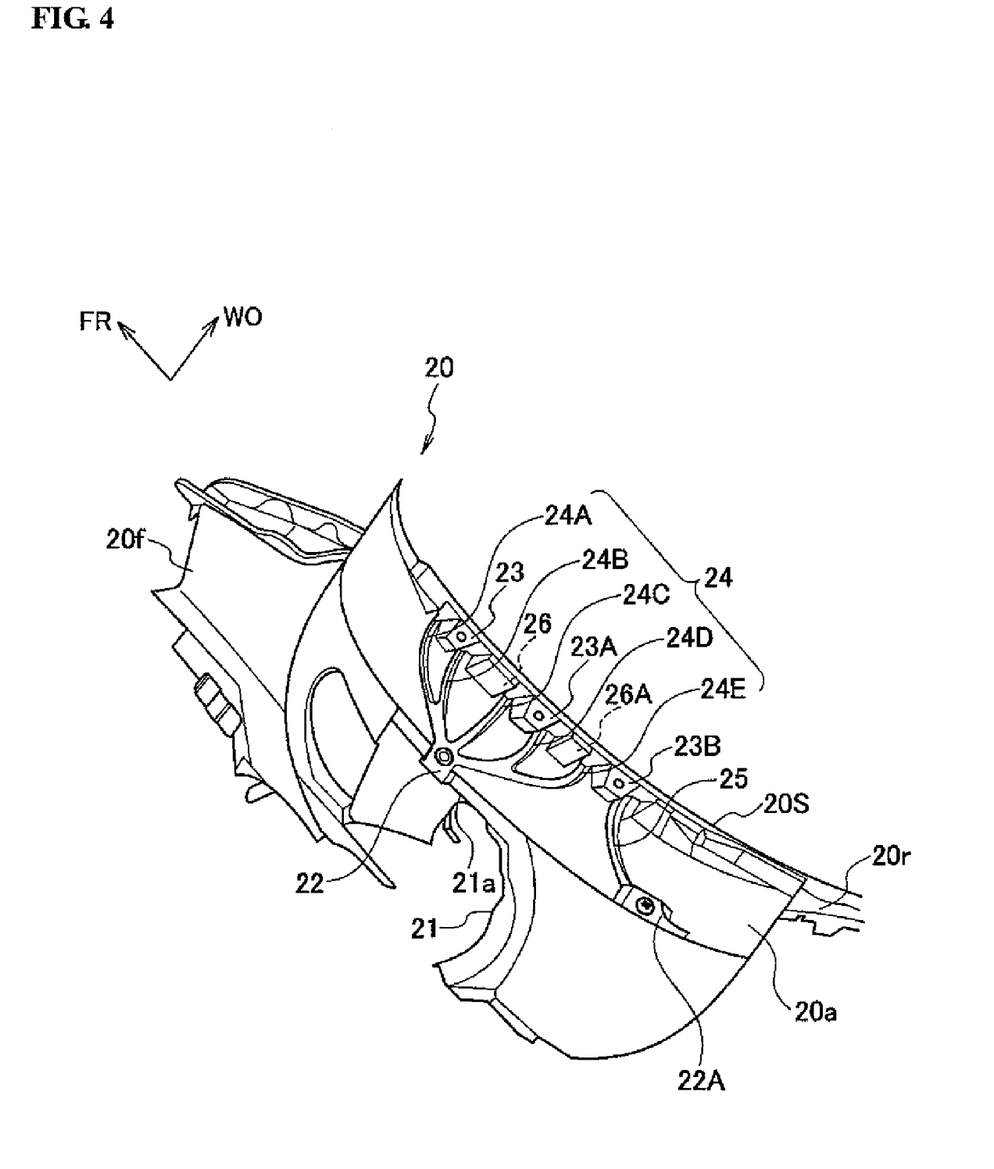
FIG. 4 is a perspective view of the fender protector in accordance with embodiments of the present disclosure when viewed from the bottom.
Figure 5:
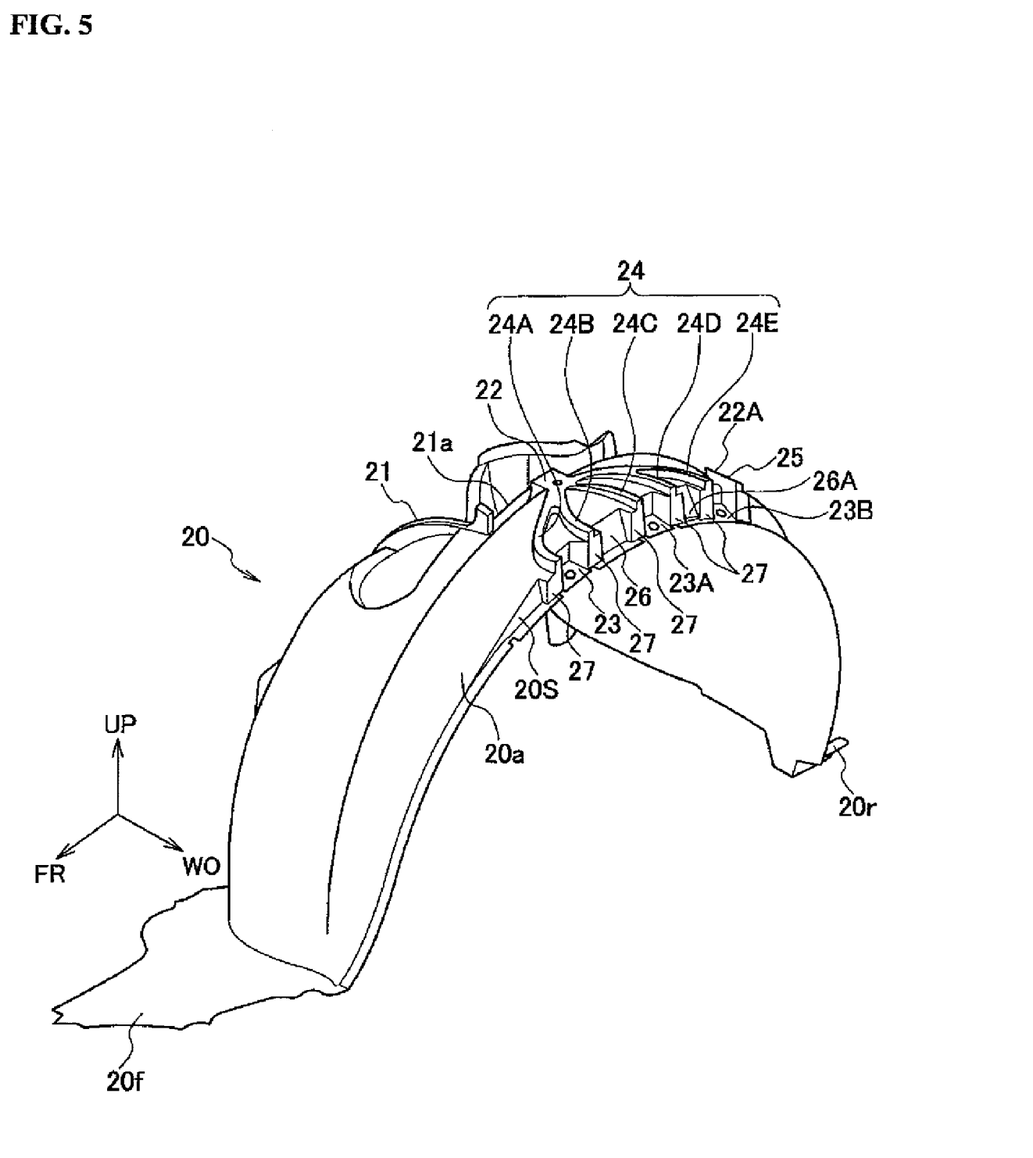
FIG. 5 is a perspective view of the fender protector in accordance with embodiments of the present disclosure when viewed from an outer front side.
Figure 6:
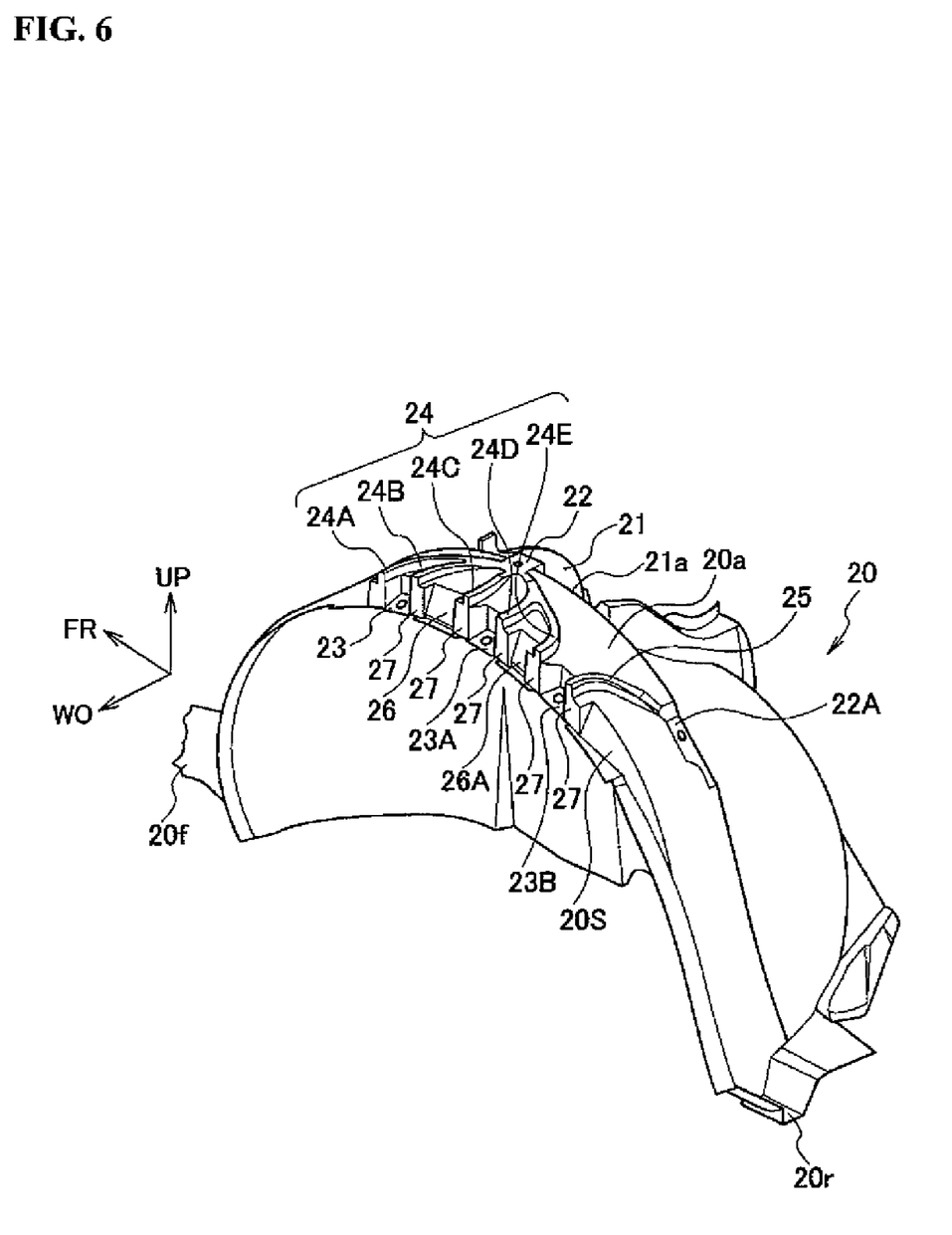
FIG. 6 is a perspective view of the fender protector in accordance with embodiments of the present disclosure when viewed from an outer rear side.
Figure 7:
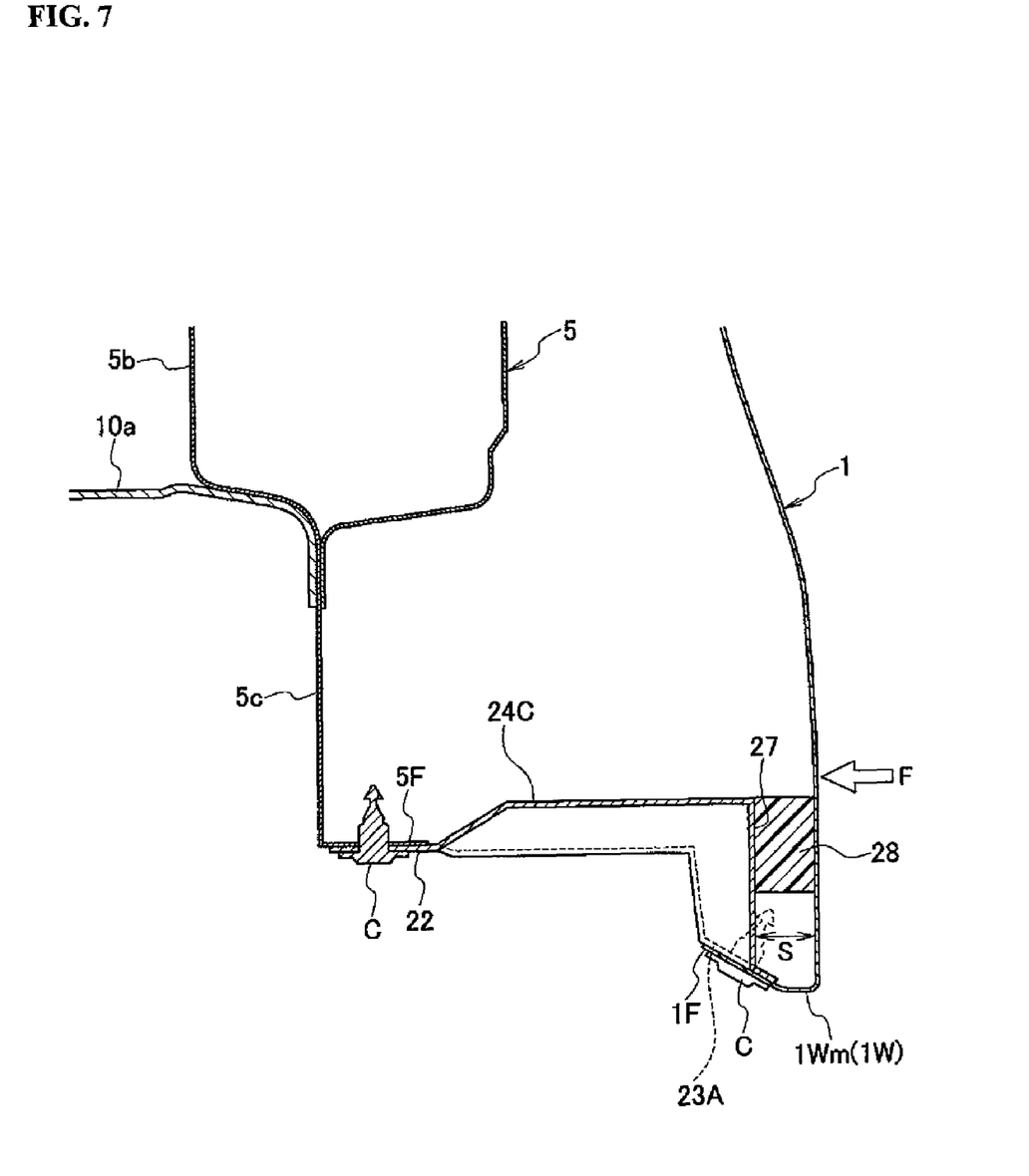
FIG. 7 is a cross-sectional view of the fender protector structure taken along a line VII-VII in FIG. 3.

FIGS. 1 to 7 show a fender protector structure in accordance with embodiments of the present disclosure. FIG. 1 is an exploded perspective view of a port side of a vehicle body front portion including a fender protector structure. FIG. 2 is a bottom view of the fender protector structure. FIG. 3 is a top view of the fender protector. FIG. 4 is a perspective view of the fender protector when seen from the bottom. FIG. 5 is a perspective view of the fender protector when seen from an outer front side. FIG. 6 is a perspective view of the fender protector when seen from an outer rear side. FIG. 7 is a cross-sectional view taken along a line VII-VII in FIG. 3. Further, in each drawing, "FR" indicates a vehicular front direction, "UP" indicates a vehicular upward direction and "WO" indicates an outer side in a vehicular width direction.

As shown in FIG. 1, in a vehicle body framework structure of select embodiments, a front pillar 3 may be assembled from a front end of a side sill 2 toward an upward direction. Further, a dash panel 4 for dividing a front compartment FC and a vehicle compartment R may be bonded between the right and left front pillars 3 (only the left front pillar 3 is shown in FIG. 1). Also, a hood ridge member 6 may protrude and be disposed in a front direction of the front pillar 3 via a hood ridge reinforcement 5. Additionally, a dash side member 7 may be fastened at an upper side of the hood ridge reinforcement 5.

Further, a front side member 8 may extend along a vehicular front-and-rear direction at lower ends of both sides in a vehicular width direction of the front compartment FC. A sub-frame (not shown) may be disposed in a bracket 9 fastened at the front end of the front side member 8. An arm of a front suspension (not shown) may be disposed in the sub-frame.

Also, a strut tower 10 may be assembled at an outer side in a vehicular width direction of the front side member 8. An upper end of the strut tower 10 may be fastened at an inner side of the hood ridge reinforcement 5.

The fender protector structure in accordance with embodiments of the present disclosure may be set in the vehicle body framework structure as described above. As shown in FIG. 1, the fender protector structure may include the front fender panel 1, which may be disposed at a vehicle width outer side of the vehicle body framework structure, and a fender protector 20.

The fender panel 1 forms a part of a vehicle body outer plate and may be disposed on the vehicle body framework structure at numerous points so as to cover an outer side in a vehicular width direction of a front wheel well 29. In select embodiments, by using bolts (not shown), an upper end installing portion 1a of the fender panel 1 may be fastened at an upper surface 7a of the dash side member 7. Further, a front end installing portion 1b of the fender panel 1 may be fastened at a front end side surface 5a of the hood ridge reinforcement 5, while a lower end installing portion 1c of the fender panel 1 may be fastened at a lower end side surface 3a of the front pillar 3. A lower portion rear end installing portion 1d of the fender panel 1 may be fastened at a lower end rear surface 3b of the front pillar 3, while an upper portion rear end installing portion 1e of the fender panel 1 may be fastened at an intermediate portion rear surface 3c of the front pillar 3. Also, a rear portion upper side installing portion 1f of the fender panel 1 may be fastened at an intermediate portion side surface 3d of the front pillar 3. The arrows shown around a periphery of the fender panel 1 in FIG. 1 indicate the fastening directions of the bolts.

A wheel arch portion 1W may be formed at a lower end of the fender panel 1. The wheel arch portion 1W may be bent in an arc shape. From FIG. 1, it may be understood that the fender panel may lack an installing point for fastening to the vehicle body framework structure at least at a peripheral intermediate portion 1Wm of the wheel arch portion 1W.

The fender protector 20 may be molded by synthetic resin in an approximately semi-arc panel shape that covers an outer periphery of a vehicle wheel well 29. Further, the fender protector 20 may prevent splash mud or rainwater from intruding into the vehicle body framework structure in the wheel well 29.

A plurality of fixing portions 22, 22A, 22B, 22C, 20f and 20r for fixing the fender protector 20 to the vehicle body framework structure is disposed in the fender protector 20 along the vehicular front-and-rear direction. As shown in FIG. 7, the fixing portions 22, 22A, 22B, 22C, 20f and 20r overlap a part of the vehicle body framework structure, such as a flange portion 5F in FIG. 7, so as to be fixed to the vehicle body framework structure by clips C. While clips C are described, it should be understood that any other appropriate fastener, including, but not limited to, screws, rivets, welds, and bolts may be used without departing from the scope of the present disclosure.

A cutout portion 21 for fitting the strut tower 10 may be formed at an upper side intermediate portion of the fender protector 20. Further, the first fixing portion 22 may be disposed adjacent to a side edge portion 21a of the cutout portion 21 at an approximately intermediate position in the vehicular width direction. Also, the second fixing portion 22A may be disposed rearward from the first fixing portion 22 at a distance L. Moreover, the fixing portions 20f and 20r may be disposed at the front and rear ends of the fender protector 20.

Further, a plurality of fixing portions 23, 23A and 23B may be formed at an end edge portion 20S in the vehicular width direction outer side of the fender protector 20. The fixing portions 23, 23A and 23B may be configured to be fixed to the fender panel 1 at or near the peripheral intermediate portion 1Wm of the wheel arch portion 1W of the fender panel 1. As shown in FIG. 7, the fixing portions 23, 23A and 23B may overlap with a part of the fender panel 1, such as a flange portion 1F in FIG. 7, such that the fixing portions 23, 23A and 23B are fixed to the fender panel 1 by clips C. The fixing portions 23, 23A and 23B may be formed in numerous regions along the vehicular front-and-rear direction and may be formed at predetermined intervals. Further, because the fixing portions 23, 23A and 23B may be formed to be recessed downwardly from an upper surface of an outer peripheral wall 20a of the fender protector 20, a step is formed between the fixing portions 23, 23A and 23B and the outer peripheral wall 20a.

Also, in the present embodiment, reinforcing beam portions 24 and 25 may be formed in the fender protector 20. The reinforcing beam portions 24 and 25 are shown formed extending from a fixing portion, such as first fixing portion 22 and second fixing portion 22A, at the vehicle body framework structure in the vehicular width direction inner side, to the peripheral intermediate portion 1Wm of the wheel arch portion 1W of the fender panel 1 at an end edge portion (end) 20S in the vehicular width direction outer side.

The reinforcing beam portion 24 extending from the first fixing portion 22 toward the vehicular width direction outer side may include a plurality (five shown) of the reinforcing beam portions 24A-E radially extending from the first fixing portion 22. Further, the reinforcing beam portion 25 may extend from the second fixing portion 22A extends in the forward direction toward the fixing portion 23B, and the reinforcing beam portion 24E extending from the first fixing portion 22 extends rearward toward the fixing portion 23B.

Further, the fixing portions 23, 23A and 23B formed at the end edge portion 20S in the vehicular width direction of the fender protector 20 may be disposed to be adjacent to two reinforcing beam portions (e.g., any two of 24A to 24E and 25). That is, as shown, fixing portion 23 may be disposed between the reinforcing beam portions 24A and 24B at the end edge portion 20S in the vehicular width direction of the fender protector 20, while the fixing portion 23A may be disposed between the reinforcing beam portions 24C and 24D at the end edge portion 20S in the vehicular width direction of the fender protector 20. Also, the fixing portion 23B may be disposed between the reinforcing beam portions 24E and 25 at the end edge portion 20S in the vehicular width direction of the fender protector 20. While a fender protector 20 is illustrated having three fixing portions 23, 23A, and 23B, and six reinforcing beam portions 24A, 24B, 24C, 24D, 24E, and 25, it should be understood that fender protectors having fewer or additional fixing portions or reinforcing beam portions may be used without departing from the scope of the present disclosure.

Also, as shown in FIGS. 5 and 6, inclined surfaces 26 and 26A may be formed as a portion of the end edge portion 20S and may be disposed between two adjacent reinforcing beam portions (any two of 24A to 24E and 25) where the fixing portions 23, 23A and 23B are not disposed. The inclined surfaces 26 and 26A are shown inclined from the surface which define the fixing portions 23, 23A and 23B to the outer peripheral surface 20a.

Further, the reinforcing beam portions 24 and 25 may be formed with upwardly convex beams. That is, as shown in FIG. 4, a back surface (a lower surface) of the fender protector 20 is formed with a plurality of grooves. Also, the grooves may protrude to form an upper surface, which may be "taller" than the outer peripheral surface 20*a* as shown in FIGS. 5 and 6.

A cross-section of the fender protector 20 and vehicle body framework structure will be explained with reference to FIG. 7. In select embodiments, a hood ridge upper panel 5*b* may extended in a downward direction. The hood ridge upper panel 5*b* may form an inner side of the hood ridge reinforcement 5, which may become a closed cross section. Further, a lower end of an extending portion 5*c*, which may extend form the hood ridge upper panel 5*b*, may be bent in a cross-sectional L-shape at the vehicular width direction outer side to form a flange portion 5F. The flange portion 5F may overlap the fixing portion 22 and may then be fixed by clip C. Moreover, a lower portion of the hood ridge upper panel 5*b* may be bonded to a suspension spring support 10*a*. The suspension spring support 10*a* may form an upper end surface of the strut tower 10.

A peripheral portion 1Wm of the wheel arch portion 1W of the fender panel 1 may be bent toward the vehicle inner side to form a flange portion 1F. The flange portion 1F may overlap the fixing portions 23, 23A and 23B in the fender protector 20 and may then be fixed by clips C. Further, FIG. 7 illustrates the fixing portion 22, the reinforcing beam 24C and the fixing portion 23A. However, the reinforcing beams 24A, 24B, 24D, and 24E and the fixing portions 23 and 23B may have similar cross-sectional shapes.

As shown in FIG. 7, in the present embodiment, a longitudinal wall portion 27 may be formed at the outer end in the vehicular width direction of the reinforcing beam portions 24 and 25. A foaming resin 28 may be disposed in a gap between the longitudinal wall portion 27 and the fender panel 1 to act as a buffering body for absorbing additional force. Foaming resin 28 may be pre-formed to fit into gap between longitudinal wall portion 27 and fender panel 1 or may, in the alternative, be "spray" molded as an injectable and expandable foam in place following assembly of fender protector 20 to fender panel 1.

According to the fender protector structure as described above, as shown in FIG. 7, if an outer force F is exerted upon fender panel 1 from the lateral outer side to the vehicular width direction inner side, fender panel 1 may bend toward the vehicular width direction inner side from outer force F.

In certain embodiments, the reinforcing beam portions 24 and 25 may be formed in the fender protector 20. The reinforcing beam portions 24 and 25 may be formed to extend from the fixing portions 22 and 22A which may be fixed to the vehicle body framework structure in the vehicular width direction inner side to the outer end in the vehicular width direction, which may be fixed to the peripheral intermediate portion 1Wm of the wheel arch portion 1W of the fender panel 1. As such, it may be possible to transfer the outer force F (i.e., the load) from the fender panel 1 to the vehicle body framework structure via the reinforcing beam portions 24 and 25. Thus, because the rigidity of the fender protector structure with respect to the outer force F may increase, it is possible to reduce the bending of the peripheral intermediate portion 1Wm of the wheel arch portion 1W of the fender panel 1.

Further, in certain embodiments, a plurality of the reinforcing beams 24A to 24E may be formed. The reinforcing beams 24A to 24E may extend radially from the fixing portion 22 toward the vehicular width direction outer side. As such, the ends at the vehicular width direction outer side of the reinforcing beam portions 24A to 24E may be disposed throughout a relatively broader range of the peripheral intermediate portion 1Wm. Also, because the rigidity of the fender protector 20 may be increased by the reinforcing beam portion 24, it may be possible to expand a region where the bending of the wheel arch portion 1W is suppressed.

Also, in certain embodiments, a plurality of the reinforcing beams (any two of 24A to 24E and 25) may be disposed so as to have the fixing portions 23, 23A and 23B disposed therebetween. As such, because the fixing portions 23, 23A and 23B may be disposed between the reinforcing beams (any two of 24A to 24E and 25), which have a high rigidity, it is possible to increase the rigidity of the fender protector 20 and the fender panel 1 during installation by increasing the rigidity of the fixing portions 23, 23A and 23B.

Further, in certain embodiments, a plurality of the reinforcing beam portions 24 and 25 may be formed. The reinforcing beam portions 24 and 25 may extend from a plurality of the fixing portions 22 and 22A spaced in the vehicular width direction inner side along the vehicular front-and-rear direction toward the fixing portion 23B which may be fixed to the peripheral intermediate portion 1Wm of the wheel arch portion 1W. That is, a plurality of the reinforcing beam portions may be formed. As such, since it is possible to disperse the outer force F into the plurality of the fixing portions 22 and 22A via these two reinforcing beam portions 24 and 25, it is possible to further increase the rigidity of the fender protector 20.

Also, in certain embodiments, the inclined surfaces 26 and 26A of the end edge portion 20S at the vehicular width direction outer side of the fender protector 20 may be formed between the ends in the vehicular width direction outer side of a plurality of the reinforcing beams (any two of 24A to 24E and 25). That is, because the bent shape may be formed with the inclined surfaces 26 and 26A, it is possible to increase the rigidity of the end edge portion 20S.

Further, in certain embodiments, the foaming resin 28 to act as the buffering body may be disposed between the fender panel 1 and the longitudinal wall portion 27 as the outer end in the vehicular width direction of the reinforcing beam portions 24 and 25. As such, an outer force F may be absorbed by the foaming resin 28. Also, in embodiments wherein the fender protector 20 only directly contacts the fender panel 1, friction between the fender protector 20 and fender panel 1 may produce a vibration or sound. However, where the foaming resin 28 is inserted and supported as described above, such a problem may be suppressed. Moreover, the buffering body may include other materials having a buffering function such as, for example, a foaming urethane, unwoven fabric, etc.

Also, the reinforcing beam portions 24 and 25 may be formed as upwardly convex beams. As such, it is possible to form the reinforcing beam portions 24 and 25 into the fender protector relatively easily. Further, it is possible to execute an operation to fasten the fender panel 1 and the fender protector 20 together by inserting a finger from a downward direction into grooves defined by the reinforcing beam portions 24 and 25. In particular, it may be seen from a downward direction that a groove may be formed between two reinforcing beam portions (any two of 24A to 24E and 25) which may define the fixing portions 23 and 23A. Thus, because it is possible to hold the fender protector 20 by inserting, for example, a thumb and an index finger into the two reinforcing beam portions (e.g., any two of 24A to 24E and 25), it may also be possible to more smoothly and securely execute an operation to attach the fixing portions 23, 23A and 23B to the fender panel 1 with clips C.

While the present disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A fender protector structure of a vehicle, comprising:
    a body structure including a body panel and a fender panel, the body structure defining a wheel well;
    a fender protector connected to the body structure and covering an outer periphery of the wheel well; and
    a reinforcing beam portion of the fender protector extending from the body panel to the fender panel,
    wherein the reinforcing beam portion comprises a first fixing portion configured to be fixed to the body panel,
    the first fixing portion comprises a plurality of fixing points; and
    the reinforcing beam portion comprises a plurality of reinforcing beams extending from the first fixing portion toward the fender panel.

2. The fender protector structure of claim 1, wherein the plurality of reinforcing beams extend radially from the first fixing portion toward the fender panel.

3. The fender protector structure of claim 2, wherein the reinforcing beam portion comprises an inclined surface disposed between two adjacent reinforcing beams.

4. The fender protector structure of claim 3, wherein the inclined surface extends from an end edge of the fender protector towards the first fixing portion.

5. The fender protector structure of claim 1, wherein:
    the reinforcing beam portion comprises a second fixing portion fixed to the fender panel; and
    the second fixing portion is disposed between the plurality of the reinforcing beams.

6. The fender protector structure of claim 1, further comprising a buffering body disposed between the reinforcing beam portion and the fender panel.

7. The fender protector structure of claim 1, wherein the reinforcing beam portion includes at least one reinforcing beam formed with an upwardly convex beam shape.

8. The fender protector structure of claim 1, wherein the reinforcing beam portion is formed integrally with the fender protector.

9. The fender protector structure of claim 1, wherein the reinforcing beam portion is disposed on the fender protector at a location corresponding to an upper portion of the wheel well.

10. The fender protector structure of claim 1, wherein the fender protector comprises a panel shape corresponding to a shape of the wheel well.

11. A method to manufacture a body of a vehicle, the method comprising:
    defining a wheel well with a body panel and a fender panel of a body structure;
    covering an outer periphery of the wheel well with a fender protector;
    extending a reinforcing beam portion of the fender protector from the body panel to the fender panel; and
    fixing the reinforcing beam portion of the fender protector to the body panel with a fixing portion,
    wherein the reinforcing beam portion comprises a first fixing portion configured to be fixed to the body panel,
    the fixing portion comprises a plurality of fixing points; and
    the reinforcing beam portion comprises a plurality of reinforcing beams extending from the fixing portion toward the fender panel.

12. The method of claim 11, further comprising providing an inclined surface between two adjacent reinforcing beams of the reinforcing beam portion.

13. The method of claim 12, further comprising extending the inclined surface from an edge of the fender protector toward the fixing portion.

14. The method of claim 11, further comprising installing a buffering body between the reinforcing beam portion and the fender panel.

15. A fender protector structure of a vehicle, comprising:
    a body structure including a body panel and a fender panel, the body structure defining a wheel well;
    a means for covering an outer periphery of the wheel well;
    a means for reinforcing the covering means; and
    a means for fixing the covering means to the body panel,
    wherein the means for reinforcing comprises a plurality of reinforcing beams extending radially from the means for fixing toward the fender panel.

16. The fender protector structure of claim 15, further comprising an inclined surface disposed between two adjacent reinforcing beams.

17. The fender protector structure of claim 15, further comprising a means for buffering disposed between the means for reinforcing and the fender panel.

* * * * *